(12) United States Patent
Bergsmann et al.

(10) Patent No.: US 9,184,491 B2
(45) Date of Patent: Nov. 10, 2015

(54) MANIPULATION-PROOF RFID ANTENNA HAVING SAFETY FEATURE

(75) Inventors: Martin Bergsmann, Linz (AT);
Gottfried Brandsetter, Grein (AT);
Helmut Kaferbock, Perg (AT)

(73) Assignee: HUECK FOLIEN GES.M.B.H., Baumgartenberg (AT)

( * ) Notice: Subject to any disclaimer, the term of this patent is extended or adjusted under 35 U.S.C. 154(b) by 511 days.

(21) Appl. No.: 13/058,075

(22) PCT Filed: Sep. 4, 2009

(86) PCT No.: PCT/EP2009/006407
§ 371 (c)(1),
(2), (4) Date: Mar. 30, 2011

(87) PCT Pub. No.: WO2010/028777
PCT Pub. Date: Mar. 18, 2010

(65) Prior Publication Data
US 2011/0169701 A1    Jul. 14, 2011

(30) Foreign Application Priority Data
Sep. 15, 2008 (EP) .................................. 08016175

(51) Int. Cl.
*H01Q 1/24* (2006.01)
*H01Q 1/22* (2006.01)
(Continued)

(52) U.S. Cl.
CPC .......... *H01Q 1/2225* (2013.01); *G06K 19/0776* (2013.01); *G06K 19/07749* (2013.01); *G06K 19/07756* (2013.01); *B42D 25/328* (2014.10); *B42D 2033/10* (2013.01)

(58) Field of Classification Search
CPC .................................................... G06K 19/0739
USPC ........................................................... 235/488
See application file for complete search history.

(56) References Cited

U.S. PATENT DOCUMENTS 6,164,548 A    12/2000   Curiel
6,618,024 B1 *   9/2003   Adair et al. ................... 343/895
(Continued)

FOREIGN PATENT DOCUMENTS

EP           1179811 A1 *   2/2002   ............... G07D 7/00
EP           1 959 377        8/2008
(Continued)

OTHER PUBLICATIONS

International Search Report issued Oct. 20, 2009 in International (PCT) Application No. PCT/EP2009/006407.
(Continued)

*Primary Examiner* — Sujoy Kundu
*Assistant Examiner* — Steven J Malone
(74) *Attorney, Agent, or Firm* — Wenderoth, Lind & Ponack, L.L.P.

(57) ABSTRACT

The invention relates to a manipulation-proof RFID antenna structure having a carrier substrate, an RFID antenna, a chip, and an adhesive coating. The structure includes the following layers in varying sequence: a) a carrier substrate, b) a thin UV-curable varnish layer into which a hologram is imprinted, c) a partial metallization as a mirror layer, k) optionally a smoothing varnish layer, l) optionally a partial copper layer forming the antenna, m) optionally a strap or a microchip, n) an adhesive layer, o) optionally a removable cover film (release liner), p) optionally a printed layer, and q) optionally a non-imprinted UV varnish layer.

20 Claims, 1 Drawing Sheet

(51) Int. Cl.
*G06K 19/077* (2006.01)
*B42D 25/328* (2014.01)

(56) References Cited

U.S. PATENT DOCUMENTS

| | | | |
|---|---|---|---|
| 7,557,715 B1 * | 7/2009 | Noakes et al. | 340/572.8 |
| 2002/0036237 A1 * | 3/2002 | Atherton et al. | 235/492 |
| 2002/0130186 A1 * | 9/2002 | Lasch et al. | 235/488 |
| 2002/0135481 A1 * | 9/2002 | Conwell et al. | 340/572.1 |
| 2003/0031819 A1 * | 2/2003 | Adams et al. | 428/40.1 |
| 2003/0175545 A1 * | 9/2003 | Kastner et al. | 428/626 |
| 2003/0179150 A1 | 9/2003 | Adair et al. | |
| 2005/0063027 A1 * | 3/2005 | Durst et al. | 359/2 |
| 2006/0228530 A1 * | 10/2006 | Bi et al. | 428/195.1 |
| 2006/0273179 A1 * | 12/2006 | Yamakage et al. | 235/492 |
| 2007/0252704 A1 * | 11/2007 | Nagae | 340/572.8 |
| 2009/0237249 A1 * | 9/2009 | Bielas | 340/572.1 |
| 2009/0250521 A1 * | 10/2009 | Fujita et al. | 235/488 |
| 2009/0251749 A1 * | 10/2009 | O'Boyle et al. | 359/2 |

FOREIGN PATENT DOCUMENTS

| | | | |
|---|---|---|---|
| EP | 1 179 811 | 10/2008 | |
| KR | 10-2005-0011832 | 1/2005 | |
| WO | WO 2008067830 A1 * | 6/2008 | G06K 19/073 |

OTHER PUBLICATIONS

Database WPI Week 200541, Thomson Scientific, AN 2005-401063, XP002523119 & KR 2005 001 832A, Jan. 31, 2005.

* cited by examiner

MANIPULATION-PROOF RFID ANTENNA HAVING SAFETY FEATURE

BACKGROUND OF THE INVENTION

The invention relates to a manipulation-proof RFID antenna having a security feature.

It is known, especially in multi-layer configurations for proof of manipulation, to provide an intermediate layer, which has a partially varying adherence to the support. This intermediate layer is provided with an adhering layer and applied onto the carrier. If an attempt is made to remove the configuration from the support, this seemingly homogeneous, substantially invisible intermediate layer is damaged in a defined manner due to the varying adhesion regions. The breakage locations can be assembled exactly again only with difficulty, with the result being that any manipulation is evident.

The varying adhesive regions are produced by way of, for example, partially applying a release layer and/or an adhesive layer on the carrier substrate. The varying adhesive regions frequently have defined forms, for example the form of patterns, indicia, lines, letters, geometric shapes, logos, lettering and the like.

A closer inspection reveals generally that the intermediate layer was damaged, that is to say manipulation has occurred. However, if particular care was taken, the damage is often not detectable at first glance.

WO 01/71848 discloses an RFID label having a track that is connected to the RFID components. If manipulation of the tag occurs, this track is damaged. If this track is damaged or interrupted, the antenna ceases to function or its properties are changed.

WO 02/077939 likewise discloses an RFID label having a track that serves to prove manipulation. This track consists of regions made of a metallic conductor and regions of electrically conductive printing ink.

SUMMARY OF THE INVENTION

It was an object of the invention to provide a manipulation-proof RFID antenna configuration, which requires no additional, contiguous or partial separation lacquer layer, and which in addition has a further security feature.

The subject matter of the invention is therefore a manipulation-proof RFID antenna, having a carrier substrate, an RFID antenna, optionally a chip, and an adhesive coating. The configuration also has the following layers in varying sequence:
a) carrier substrate
b) thin, UV-curable lacquer layer, embossed in which is a hologram,
c) partial metallization as a mirror layer,
d) optionally a smoothing lacquer layer,
e) optionally a partial copper layer which forms the antenna,
f) optionally a strap or microchip,
g) a self-adhesive coating,
h) optionally a cover film (release liner).

The antenna configuration according to the invention thus has no conventional void layer (a layer whose adhesion varies at least regionally).

In addition, however, the configuration has an additional security feature in the form of an optically active feature, substantially a diffraction structure, for example a hologram, which is positioned in register with the antenna structure.

Suitable carrier substrates 1 are, for example, flexible plastics films, for example made of PI, PP, MOPP, PE, PPS, PEEK, PEK, PEI, PSU, PAEK, LCP, PEN, PBT, PET, PA, PC, COC, POM, ABS, PVC. The thickness of the carrier films (substrates) preferably ranges from 5-700 µm, preferably 10-200 µm, particularly preferably 30-70 µm.

The carrier substrate 1 can already be printed with one or more layers 9.

In a coating method such as, for example, a screen printing, gravure printing or flexographic printing method, the carrier substrate is coated with a radiation-curable lacquer. The coating forms a transfer lacquer layer.

The radiation-curable lacquer can be, for example, a radiation-curable lacquer system based on a polyester system, an epoxy system or a polyurethane system containing two or more different photoinitiators which are known to a person skilled in the art and which can initiate curing of the lacquer system to varying extents at different wavelengths. For example, a photoinitiator can be activatable at a wavelength of 200 nm to 400 nm, the second photoinitiator is then activatable at a wavelength of 370 to 600 nm. Keeping sufficient distance between the activation wavelengths of the two photoinitiators ensures that the excitation of the second photoinitiator is not too strong while the first photoinitiator is activated. The range in which excitation of the second photoinitiator takes place should be within the transmission wavelength range of the carrier substrate used. It is also possible to use electron radiation for the main curing (activation of the second photoinitiator).

A water-dilutable lacquer can also be used as the radiation-curable lacquer. Polyester-based lacquer systems are preferred.

The layer thickness of the applied radiation-curable lacquer can vary depending on the requirements relating to the finished product and on the thickness of the substrate. Generally, the thickness lies between 0.5 and 50 µm, preferably between 2 and 10 µm, particularly preferably between 2 and 5 µm.

The surface structure, that is to say the diffraction or relief structure, is molded, for example, at a controlled temperature by a die or using an embossing die into the radiation-curable lacquer, which was pre-cured up to the gel point by activation of the first photoinitiator and is, at the time of the molding, in this state. If a water-dilutable radiation-curable lacquer is used, pre-drying can optionally be carried out first, for example, using an IR emitter.

The embossing die can be transparent, and it can be a welded, adhesively bonded, soldered or seamless metal sleeve or plastics sleeve. Preference is given to the use of nickel sleeves. It is expedient to mount the embossing tool onto a temperature-controlled pneumatic and convection-cooled or heated clamping cylinder in order to obtain exact embossing of the surface structure 3.

Here, the carrier substrate is brought into contact with the temperature-controlled clamping cylinder. The embossing of the surface structure preferably takes place only if the carrier substrate coated with the radiation-curable lacquer is in contact with the cylinder. In this case, the process parameters such as pressure and especially temperature are controlled exactly in order to avoid a change in the lacquer layer state that is too quick or too slow. In the process, the UV lacquer is cured and subsequently post-cured.

A partial metallic coating is subsequently applied onto the embossed structure to form the mirror layer 4 for the hologram. This metallic layer can already form the antenna. If a separate antenna is applied thereafter, the form of the mirror layer either corresponds to the form of the antenna that was applied later, exactly the inverse form of the antenna, is disposed contiguously over the entire label or has a discrete form which differs from the antenna.

Suitable partial metallic coatings are, by way of example, Cr, Al, Ag, Ti, Cu, Pd, Pt, Au and the like. This coating preferably consists of the same metal as the antenna that is to be applied thereafter. The thickness of the partial metal layer ranges from 5 nm-50 µm, preferably 20 nm-100 nm as the mirror layer and 0.5 µm-50 µm as the antenna.

The partial application can be carried out using selective metallization. For example, the partial application can be performed by a mask, or by using contiguous metallization with a subsequent etching method or subsequent demetallization. A demetallization method of this type is known, for example, from EP 1 291 463 or from EP 1 332 238.

Optionally, a smoothing lacquer layer 5 is subsequently applied contiguously or partially at least in the embossed regions in order to smooth the embossed surface. The smoothing lacquer layers consist of a lacquer system that withstands the temperatures reached in the subsequent metallization step undamaged. The smoothing lacquer layer is especially advantageous for achieving the maximum conductivity of an antenna that is subsequently applied preferably in register with the metal mirror. Without the smoothing lacquer layer, the metallic antenna layer can, if thin metal layers are used, follow the topography of the embossed surface. As a result, the effective conductor cross section is lower in some regions, so that the conductivity is reduced in comparison with a smooth film vapor-coated with the same amount of metal.

The smoothing lacquer layer is applied in a coating method such as, for example, a screen printing, gravure printing or flexographic printing, inkjet or offset method, roller application method, by painting, spraying, curtain coating or the like.

On top of this smoothing lacquer layer, an antenna structure 6 is subsequently placed. This partial metallic layer consists, for example, of Cr, Al, Ag, Ti, Cu, Pd, Pt, Au and the like, but preferably consists of copper, and is applied in register with the partial metal (mirror) layer 4, which forms the mirror for the hologram.

The partial application can be carried out using selective metallization, for example, by a mask, or by using contiguous metallization with a subsequent etching method or subsequent demetallization.

The thickness of the metallic coating which forms the antenna preferably ranges from 0.5 to 50 µm. This layer can optionally also be galvanically reinforced. Such a method is described in EP 1 332 238.

In another embodiment, the antenna is produced by printing on a conductive lacquer, such as a silver conductive paste. Possible coating methods include, for example, screen, gravure, flexographic, inkjet or offset printing.

Furthermore, a strap or a chip 7 can be applied onto the carrier substrate. This strap or chip can be used to store and read data. By way of example, this chip can be a conventional RFID chip or a structure printed on an Si-basis or a polymeric microcircuit. Furthermore, a resonant RLC circuit can also be applied in place of a chip and the antenna.

Suitable adhesive coating layers 8 are, for example, self-adhesive layers or thermally activatable or pressure-activatable adhesive layers. The security feature can then be applied onto any desired object to be monitored, such as textile, glass, plastics, metal, paper, non-wovens and the like, using this adhesive layer.

The adhesive coating 8 is preferably covered by a removable cover film or a release liner that is easy to remove.

In the described embodiment, the embossed structure (the hologram) can be seen from the side of the carrier substrate.

In an alternative embodiment, the embossed structure can be visible from the side of the adhesive coating, with the result that it can be viewed through a transparent carrier object, such as a glass pane, for example.

To this end, the configuration carrying the antenna (carrier substrate, embossed UV lacquer layer, mirror layer, smoothing lacquer, antenna) is laminated against a carrier substrate which has a smooth, non-embossed UV lacquer layer. In the process, the release, that is to say the force required for removing the carrier film, of the non-embossed UV lacquer layer is set such that it is greater than the release of the embossed UV lacquer layer.

The carrier substrate is then removed from the embossed UV lacquer layer, the strap or chip is applied onto the embossed UV lacquer layer, and the antenna subsequently provided with a self-adhesive coating. The coupling between strap or chip and antenna is in this embodiment of a capacitive or inductive nature since there is no direct electric contact between the chip and the antenna.

If electric contact between strap or chip and antenna is necessary, a strap or chip can be applied in another embodiment onto the antenna-carrying configuration using a conductive adhesive (direct electric contacting), and the configuration can subsequently be laminated against a carrier substrate which has a smooth, non-embossed UV lacquer layer. The embossed lacquer layer can, after the carrier substrate has been removed from it, be provided with a self-adhesive coating. In this case, the release, that is to say the force required for removing the carrier film, of the non-embossed UV lacquer layer is set such that it is greater than the release of the embossed UV lacquer layer.

If an attempt is made to remove the label once it has been applied onto a carrier or object to be monitored (secured), as occurs, for example, in the case of manipulation, only the carrier substrate 1 is removed. However, the remaining layer configuration (base section) including the thin UV curable lacquer layer remains on the carrier. In other words, the UV curable layer forms a transfer layer (release line) which causes only the carrier substrate (and any printed layer 9 formed thereon) to be removed from the object to be monitored upon manipulation of the film.

Due to the low thickness of the layer configuration remaining on the carrier in comparison with the adhesive layer, the carrier can no longer be removed undamaged, with the result that manipulation (for example transfer to a different substrate) is not possible without changing or damaging the transponder function of the label.

Moreover, the carrier substrate can also be printed.

The RFID antenna according to the invention can be used, for example, to secure objects, for toll systems and the like.

1 is the carrier substrate,
2 is the release line at which the configuration is separated if an attempt to peel the label off the carrier is made,
3 is the embossed lacquer layer,
4 is the mirror layer,
5 is a smoothing lacquer layer,
6 is the antenna,
7 is a strap or chip,
8 is a self-adhesive coating,
9 is an optional printed layer,
10 is a smooth UV lacquer layer,
11 is a lamination adhesive layer.

DETAILED DESCRIPTION OF THE DRAWINGS

Figure 1:
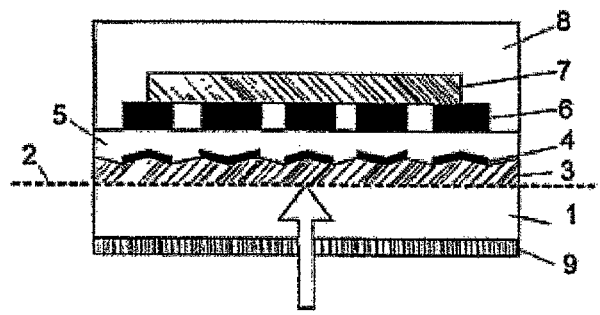
FIGS. 1 to 3 show embodiments of the antenna according to the invention. In the figures.

FIG. 1 shows an embodiment in which the embossed structure can be seen from the side of the carrier substrate, and a capacitive or inductive coupling is present between strap or chip and antenna.

Figure 2:
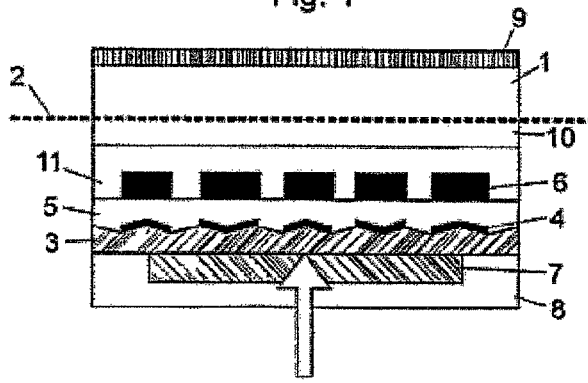

FIG. 2 shows an embodiment in which the hologram can be seen from the side of the adhesive coating, and a capacitive or inductive coupling is present between strap or chip and antenna.

Figure 3:
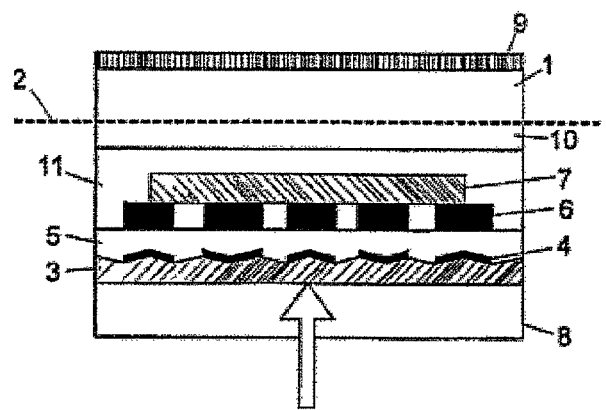

FIG. 3 shows an embodiment in which the hologram can be seen from the side of the adhesive coating, and a direct electric contact is present between strap or chip and antenna. The direct contact can be brought about with the aid of a conductive adhesive for example. Lamination is carried out after the strap or chip has been applied.

The invention claimed is:

1. A manipulation-proof film material having a transponder antenna configuration, comprising:
 a carrier substrate;
 a UV-curable lacquer layer forming a transfer layer, a hologram being embossed in said UV-curable lacquer layer;
 an antenna;
 partial metallic mirror layer forming said hologram; and
 an adhesive coating for attaching said film material to an object to be monitored;
 wherein said transfer layer is located between said carrier substrate and a base section of said film material, said base section including an entirety of said antenna, an entirety of said mirror layer forming said hologram, and said adhesive coating;
 wherein said transfer layer, said antenna, and said mirror layer forming said hologram are all located between said carrier substrate and said adhesive coating; and
 wherein said transfer layer being configured to release said carrier substrate upon manipulation of said film material such that an entirety of said base section of said film remains attached to the object via said adhesive coating.

2. The film material of claim 1, wherein said antenna is formed of a partial copper layer such that a form of said mirror layer corresponds to a form of said antenna, said base section of said film material further including:
 a smoothing lacquer layer;
 a strap or microchip for storing and reading data;
 a removable cover film covering said adhesive coating, said cover film to be removed prior to attaching said film material to the object to be monitored.

3. The film material of claim 2, further comprising a print layer formed on said carrier substrate, wherein said carrier substrate comprises a non-embossed UV lacquer layer.

4. The film material of claim 1, further comprising a print layer formed on said carrier substrate, wherein said carrier substrate comprises a non-embossed UV lacquer layer.

5. The film material of claim 1, wherein a thickness of said UV-curable lacquer layer is in a range of 0.5 µm to 50 µm.

6. The film material of claim 5, wherein a thickness of said metallic mirror layer is in a range of 20 nm to 100 nm.

7. The film material of claim 5, wherein a thickness of said antenna is in a range of 0.5 µm to 50 µm.

8. The film material of claim 5, wherein said antenna is galvanically reinforced.

9. The film material of claim 5, wherein each of said mirror layer and said antenna independently consist of at least one of Cr, Al, Ag, Ti, Cu, Pd, Pt, and Au.

10. The film material of claim 5, wherein said mirror layer and said antenna are formed of the same metal.

11. The film material of claim 5, wherein said antenna comprises a first antenna, said mirror layer forming a second antenna.

12. The film material of claim 5, wherein said antenna and said mirror layer are structured differently.

13. The film material of claim 1, wherein a thickness of said metallic mirror layer is in a range of 20 nm to 100 nm.

14. The film material of claim 1, wherein a thickness of said antenna is in a range of 0.5 µm to 50 µm.

15. The film material of claim 1, wherein said antenna is galvanically reinforced.

16. The film material of claim 1, wherein each of said mirror layer and said antenna independently consist of at least one of Cr, Al, Ag, Ti, Cu, Pd, Pt, and Au.

17. The film material of claim 1, wherein said mirror layer and said antenna are formed of the same metal.

18. The film material of claim 1, wherein said antenna comprises a first antenna, said mirror layer forming a second antenna.

19. The film material of claim 1, wherein said antenna and said mirror layer are structured differently.

20. A member formed from said film material of claim 1, said member having the form of one of a tag, a strip, and a patch.

* * * * *